US008959926B2

(12) United States Patent
Bil et al.

(10) Patent No.: US 8,959,926 B2
(45) Date of Patent: Feb. 24, 2015

(54) GAS TURBINE HIGH PRESSURE COMPRESSOR FLUID RETURN AND REINJECTION INCLUDING AN ANNULAR AIR BLEEDING MANIFOLD

(75) Inventors: Eric Stephan Bil, Chartrettes (FR); Michel Gilbert Roland Brault, Quincy Sous Senart (FR)

(73) Assignee: SNECMA, Paris (FR)

( * ) Notice: Subject to any disclaimer, the term of this patent is extended or adjusted under 35 U.S.C. 154(b) by 1078 days.

(21) Appl. No.: 12/994,782

(22) PCT Filed: May 19, 2009

(86) PCT No.: PCT/FR2009/000582
§ 371 (c)(1),
(2), (4) Date: Nov. 26, 2010

(87) PCT Pub. No.: WO2009/144415
PCT Pub. Date: Dec. 3, 2009

(65) Prior Publication Data
US 2011/0072829 A1 Mar. 31, 2011

(30) Foreign Application Priority Data
May 29, 2008 (FR) ...................................... 08 02923

(51) Int. Cl.
*F02C 6/04* (2006.01)
*F02C 9/18* (2006.01)
*F04D 27/02* (2006.01)

(52) U.S. Cl.
CPC .............. *F02C 9/18* (2013.01); *F04D 27/0207* (2013.01); *F04D 27/0238* (2013.01); *F04D 27/0215* (2013.01); *F04D 27/023* (2013.01); *F05D 2270/101* (2013.01)

USPC .............. 60/785; 60/782; 415/58.4; 415/58.5

(58) Field of Classification Search
CPC .............. F02C 7/141; F02C 9/18; F02C 6/08; F04D 29/68; F04D 27/0207; F04D 27/0215; F04D 27/0238
USPC ........... 60/785, 782, 795; 415/58.4, 58.5, 144
See application file for complete search history.

(56) References Cited

U.S. PATENT DOCUMENTS 4,463,552 A * 8/1984 Monhardt et al. ............ 60/226.1
4,640,091 A * 2/1987 Blizzard ......................... 60/795
(Continued)

FOREIGN PATENT DOCUMENTS

DE     33 33 437           4/1985
DE     1898067 A2  *  3/2008 ................ F02C 6/08
(Continued)

OTHER PUBLICATIONS

International Search Report issued Mar. 2, 2010 in PCT/FR09/000582 filed May 19, 2009.

*Primary Examiner* — William H Rodriguez
*Assistant Examiner* — Rene Ford
(74) *Attorney, Agent, or Firm* — Oblon, Spivak, McClelland, Maier & Neustadt, L.L.P.

(57) ABSTRACT

A turbomachine including an intermediate casing including, fastened to the end thereof, an outer casing of a high pressure compressor, and an air bleed mechanism bleeding air downstream from the stream through the compressor and including an outlet connected to an air reinjection mechanism reinjecting air upstream from the compressor via an annular manifold surrounding the inner wall of the intermediate casing and situated radially between the inner wall and an outer wall defining a secondary flow stream of the turbomachine.

13 Claims, 3 Drawing Sheets

(56) References Cited

U.S. PATENT DOCUMENTS

| | | | |
|---|---|---|---|
| 4,893,984 A * | 1/1990 | Davison et al. | 415/48 |
| 5,297,386 A | 3/1994 | Kervistin | |
| 5,619,850 A * | 4/1997 | Palmer et al. | 60/772 |
| 6,467,252 B1 * | 10/2002 | Payling et al. | 60/39.53 |
| 7,077,623 B2 * | 7/2006 | Guemmer | 415/58.5 |
| 7,811,050 B2 * | 10/2010 | Roth | 415/58.5 |
| 7,967,556 B2 * | 6/2011 | Gummer | 415/144 |
| 8,043,046 B2 * | 10/2011 | Guemmer | 415/115 |
| 8,061,974 B2 * | 11/2011 | Gu et al. | 415/145 |
| 8,066,471 B2 * | 11/2011 | Bayere et al. | 415/58.5 |
| 8,162,591 B2 * | 4/2012 | Grauer | 415/58.4 |
| 8,182,209 B2 * | 5/2012 | Brault et al. | 415/144 |
| 8,192,148 B2 * | 6/2012 | Guemmer | 415/145 |
| 2005/0226717 A1 * | 10/2005 | Xu | 415/58.5 |
| 2005/0244269 A1 * | 11/2005 | Loudet | 415/198.1 |
| 2009/0044543 A1 * | 2/2009 | Clemen et al. | 60/785 |
| 2009/0148273 A1 * | 6/2009 | Suciu et al. | 415/159 |

FOREIGN PATENT DOCUMENTS

| | | |
|---|---|---|
| EP | 1 500 824 | 1/2005 |
| FR | 2 695 161 | 3/1994 |
| WO | 2006 060010 | 6/2006 |

* cited by examiner

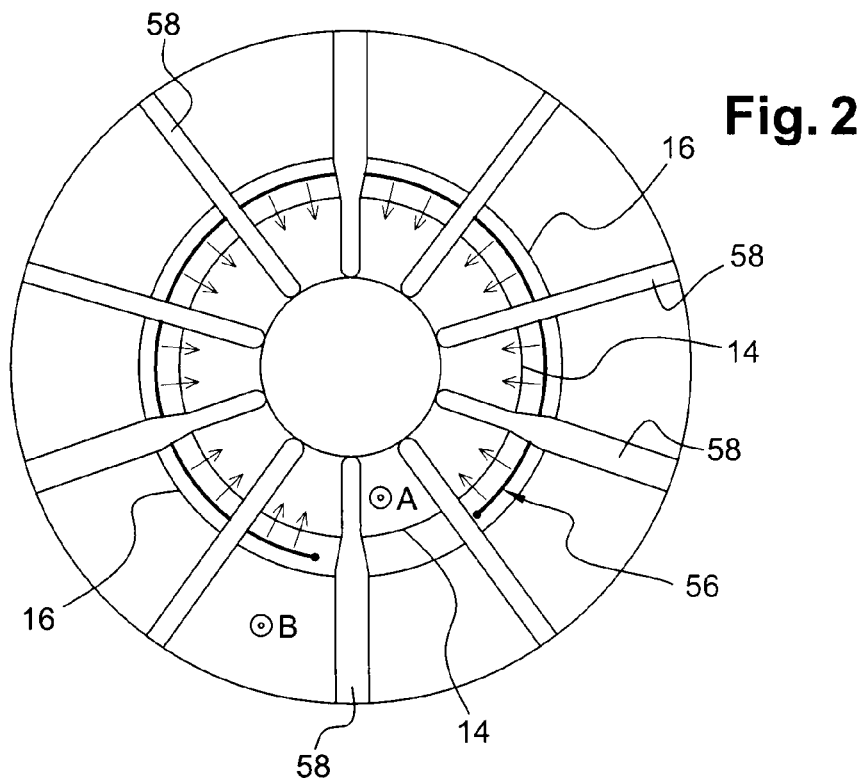
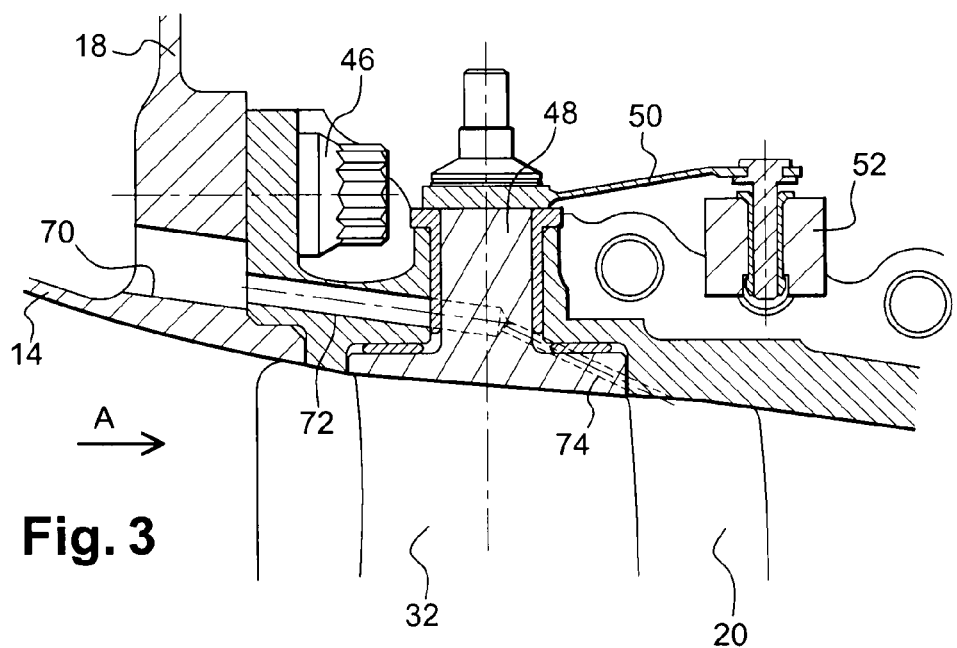

GAS TURBINE HIGH PRESSURE COMPRESSOR FLUID RETURN AND REINJECTION INCLUDING AN ANNULAR AIR BLEEDING MANIFOLD

BACKGROUND OF THE INVENTION

1. Field of the Invention

The present invention relates to a turbomachine fitted with a system for injecting air into a high pressure compressor.

2. Description of the Related Art

A bypass turbomachine has an upstream air inlet that feeds a primary air stream passing through low and high pressure compression stages and then through a combustion chamber, and a secondary air stream surrounding the compression stages and the combustion chamber and joining the outlet of the primary air stream in order to increase thrust.

The high pressure compressor comprises alternating guide vanes and rotor wheels surrounded by an outer casing.

During operation of the turbomachine, a pumping phenomenon can appear, which phenomenon consists in a sudden reversal of the flow direction through the high pressure compressor. This phenomenon is like an impact and may have disastrous mechanical consequences such as breaking blades or damaging sealing devices in the stream through the high pressure compressor.

Separation of the boundary layer of air from the inside surface of the outer casing of the high pressure compressor can lead to disturbances in the air flow of the primary stream, thereby encouraging pumping of the high pressure compressor.

To avoid the boundary layer separating, and thus to increase the pumping margin, it is known to bleed air from a downstream portion of the high pressure compressor between a guide vane stage and a rotor wheel and to reinject the air upstream from the first rotor wheel at the inlet of the high pressure compressor.

That technique involves using an annular air manifold mounted radially around the outer casing of the high pressure compressor. Nevertheless, the space available around the outer casing is already occupied to a large extent by accessories and equipment of the turbomachine such as fuel and oil pipes, electrical circuits, actuators, . . . . In general, the first guide vane stages are variable-pitch stages, having vanes with pivots passing through the outer casing and connected by cranks to respective control rings mounted around the outer casing and actuated by respective actuators or motors housed in said space. It is therefore difficult if not impossible to place a manifold around the outer casing in order to reinject air upstream from the first rotor wheel.

It is not possible to envisage lengthening the high pressure compressor and placing the manifold between the inlet guide vane stage and the first rotor wheel, since that solution would lead to an unacceptable increase in the length and the weight of the turbomachine.

BRIEF SUMMARY OF THE INVENTION

A particular object of the invention is to solve that problem in a manner that is simple, effective, and inexpensive.

To this end, the invention provides a turbomachine, such as a bypass turbojet, including an intermediate casing comprising an inner wall forming a body of revolution defining the outside of a primary air flow stream and having fastened to the downstream end thereof an outer casing of a high pressure compressor, and air bleed means for bleeding air downstream from the stream through the high pressure compressor, the outlet of the air bleed means being connected to air reinjection means for reinjecting air into an upstream portion of the high pressure compressor, the turbomachine being characterized in that the air bleed means are connected to the air reinjection means by an annular manifold surrounding the inner wall of the intermediate casing upstream from the high pressure compressor and situated radially between said inner wall and an outer wall of the intermediate casing forming a body of revolution that defines the inside of the secondary air flow stream of the turbomachine.

According to the invention, the annular manifold is arranged inside the intermediate casing, thereby avoiding lengthening the compressor and increasing the weight of the turbomachine, while nevertheless being capable of being fed in simple manner with air that has been bled from downstream along the high pressure compressor. The connection between the reinjection means and the annular manifold can be made simply, thereby enabling fabrication costs to be minimized.

According to another feature of the invention, the manifold extends between a downstream annular plate of the intermediate casing and curved flow deflection walls formed in the intermediate casing at the outlets from discharge valves.

Pre-existing walls are thus used to define the manifold, at least in part.

The manifold is also defined by a radially outer wall that connects the flow deflector walls to the downstream annular plate of the intermediate casing.

This radially outer wall may advantageously be made as a casting together with the flow deflector walls and the downstream annular plate.

In a variant, it may be fitted between the flow deflector walls and the downstream annular plate.

The manifold extends through at least some of the radial arms of the intermediate casing, and over an angular extent as shown in FIG. 2, said extent possibly being 360°.

Advantageously, the manifold has a section of area that varies circumferentially in order to deliver air at a pressure that is substantially uniform to all of the reinjection means.

The manifold may include at least one feed orifice made in the downstream annular plate of the intermediate casing and connected to the air bleed means.

According to another feature of the invention, the air reinjection means comprise a plurality of holes formed in the downstream annular plate of the intermediate casing and distributed at the periphery of the manifold.

Each hole may open out downstream into another hole formed in the thickness of the outer casing of the compressor, said other hole opening out into the stream through the compressor upstream from the first rotor wheel. This other hole may comprise a first portion opening out into a second portion that is oblique, being oriented towards the leading edges of the blades of the first rotor wheel of the compressor.

BRIEF DESCRIPTION OF THE SEVERAL VIEWS OF THE DRAWINGS

The invention can be better understood and other details, advantages, and characteristics of the invention appear on reading the following description made by way of non-limiting example and with reference to the accompanying drawings, in which:

FIG. 2 is a diagrammatic view seen from downstream of the intermediate casing including an annular manifold of the invention;

FIG. 3 is a fragmentary diagrammatic view in axial section of means of the invention for reinjecting air into the high pressure compressor of the invention.

DETAILED DESCRIPTION OF THE INVENTION

Figure 1:
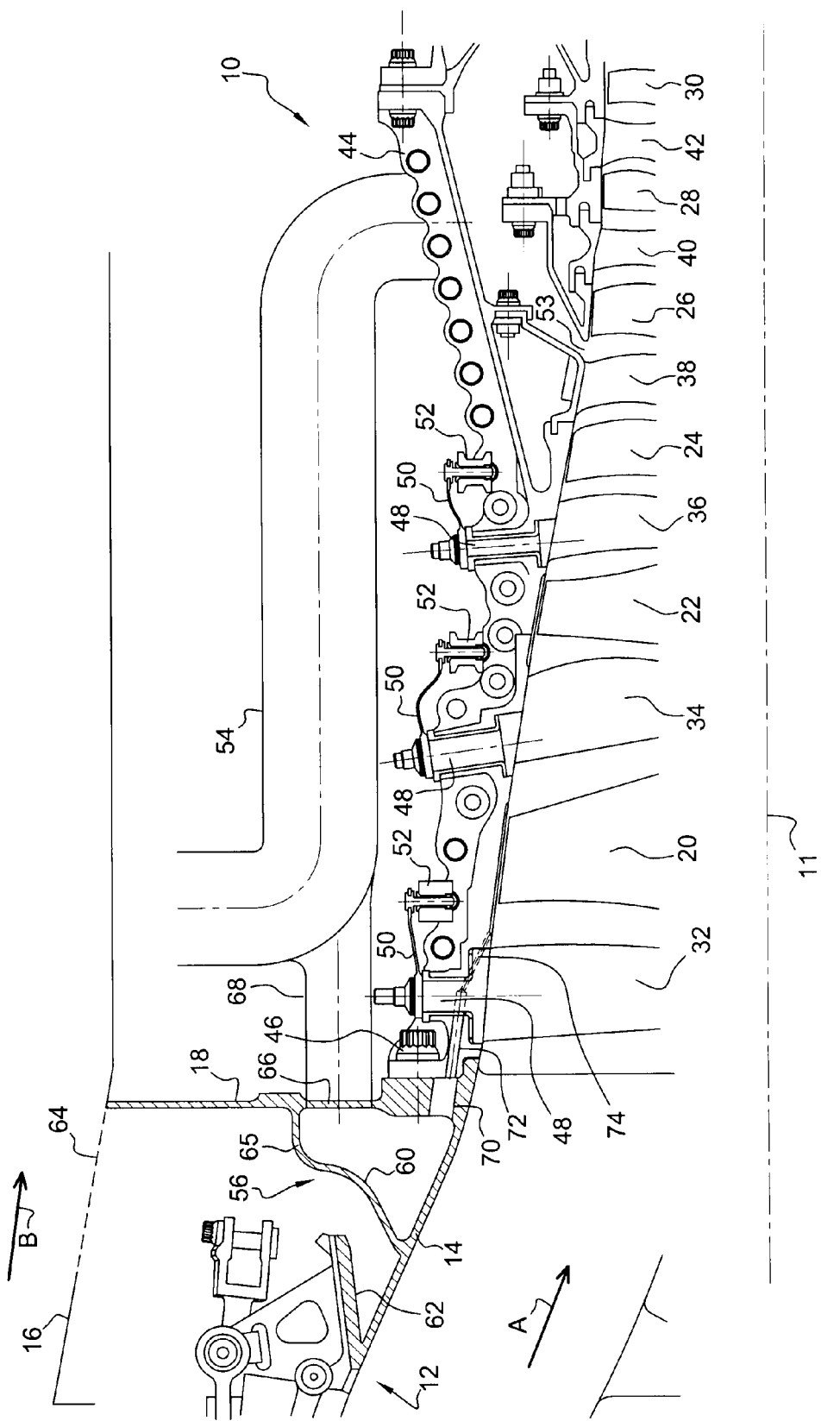
FIG. 1 is a fragmentary diagrammatic half-view in axial section of a turbomachine comprising a high pressure compressor arranged upstream from an intermediate casing, and means for reinjecting air into the high pressure compressor according to the invention.

Reference is made initially to FIG. 1 which shows a high pressure compressor 10 of axis 11 arranged downstream from an intermediate casing 12 that has two coaxial walls forming inner and outer bodies of revolution 14 and 16 connected together at their downstream ends by an annular plate 18. The inner wall 14 defines the outside of a primary air flow stream (arrow A), and the outer wall 16 defines the inside of a secondary air flow stream (arrow B).

The high pressure compressor 10 comprises alternating rotor wheels 20, 22, 24, 26, 28, and 30 and guide vanes 32, 34, 36, 38, 40, and 42 surrounded by an outer casing 44 fastened by bolts 46 at its upstream end to the downstream plate 18 of the intermediate casing 12. The inlet to the high pressure compressor 10 comprises a guide vane 32 serving to channel the outgoing air flow from the stream of the intermediate casing 12 towards the first rotor wheel 20. The first three guide vane stages 32, 34, and 36 of the high pressure compressor 10 are of variable pitch, i.e. the orientation of their vanes relative to the primary air flow A is variable as a function of engine speed, thus making it possible to optimize the operation of the turbomachine. For this purpose, each guide vane 32, 34, 36 has a pivot 48 at its radially outer end that is mounted in an orifice in the outer casing 44. Each vane pivot 48 is connected at its radially outer end by a crank 50 to a control ring 52 that extends around the outer casing 44 of the compressor 10 and that is movable in rotation about the axis 11 of the compressor 10 by an actuator or a motor for the purpose of imparting rotary movement to the vanes about the axes of their pivots 48.

An air bleed is provided, e.g. for de-icing purposes, between the fourth guide vane stage 38 and the fourth rotor wheel 26 of the high pressure compressor 10. For this purpose, an annular axial space 53 is formed between the radially outer downstream end of the guide vane stage 38 and the radially outer upstream of the rotor wheel 26. The means for bleeding air from the high pressure compressor 10 comprise a duct 54 having its suction end mounted in an orifice of the outer casing 44. This orifice is positioned axially along the outer casing 44 in such a manner as to communicate with the axial space 53 between the guide vane stage 38 and the rotor wheel 26.

In operation, a fraction of the primary air flow A flowing through the high pressure compressor 10 escapes through the axial space 53 and is sucked into the duct 54, thereby enabling this air under pressure to be taken to equipment that needs to be de-iced. According to the invention, a fraction of the bleed air is reinjected upstream from the first rotor wheel 20 in order to limit separation of the boundary layer of air at the walls defining the outside of the air stream passing through the high pressure compressor 10, where such separation would have the consequence of reducing the pumping margin of the compressor 10.

This type of air reinjection requires a manifold to be installed around the outer casing 44 of the high pressure compressor 10, and that is very difficult to implement because of the presence of the variable pitch systems 48, 50, 52 and of other items of equipment such as electrical, lubrication, or fuel circuits.

According to the invention, an annular manifold 56 is mounted between the inner and outer walls 14 and 16 of the intermediate casing 12 and feeds air injection means formed in the annular plate 18 and the outer casing 44 of the compressor 10.

The annular manifold 56 extends through at least some of the radial arms 58 of the intermediate casing 12 (FIG. 2). These arms 58 cross the primary and secondary air flow streams A and B and they serve to transmit forces in flight and to pass services or equipment such as cables, hydraulic ducts, etc. Each circumferential space between two consecutive arms 58 of the intermediate casing 12 has a curved wall 60 that extends circumferentially from one arm to another and that serves to deflect a flow of air from a discharge valve 62 mounted upstream from each curved wall 60, which valve is shown in the open position in FIG. 1.

On takeoff and landing and when the airplane is flying through cloud, it is possible that hail stones enter into the primary air flow and reach the combustion chamber (not shown) into which the high pressure compressor 10 opens out, leading to a consequent risk of the combustion chamber going out. Opening the discharge valves 62 enables a portion of the air flow containing hail stones to be deflected by the curved wall 60 through grids 64 of the outer annular wall 16 of the intermediate casing 12 so as to be discharged into the secondary air flow B. Opening the discharge valve 62 thus enables pumping of the high pressure compressor 10 to be avoided in certain configurations.

The section of the annular manifold 56 is defined on the inside by the inner wall 14 of the intermediate casing 12, downstream from the annular plate 18, and upstream from the deflector walls 60 having their concave sides facing towards the inside of the manifold 56. A radially outer wall 65 connects the curved walls 60 to the downstream annular plate 18 of the intermediate casing 12 so as to close the manifold 56.

The manifold 56 has at least one feed orifice 66 made through the downstream annular plate 18 of the intermediate casing 12 and connected by a tube 68 to the air bleed duct 54.

Figure 4:
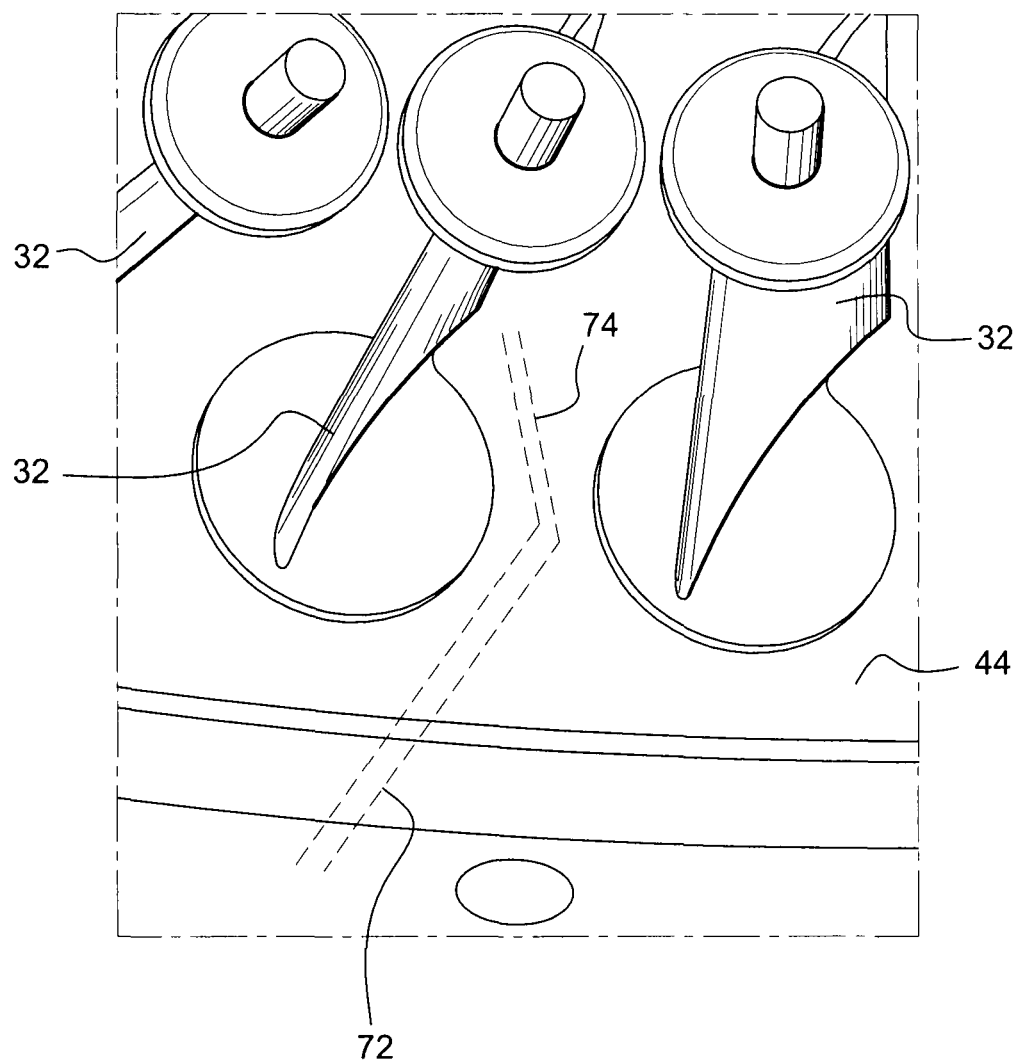
FIG. 4 is a fragmentary diagrammatic view in perspective of the inlet guide vane stage mounted in the outer casing of a high pressure compressor and of the means for reinjecting into the compressor.

Air reinjection means are fed by the manifold 56 so as to reinject air that has been taken downstream from the high pressure compressor 10 at a point upstream from the first rotor wheel 20. These reinjection means comprise a plurality of holes 70 formed through the downstream annular plate 18 and regularly distributed around its periphery. These holes 70 are positioned radially between the feed orifice 66 and the inner wall 14 of the intermediate casing 12 and they are circumferentially distributed between the bolts 46 for fastening the outer casing 44 to the downstream plate 18. Each hole 70 opens out downstream into a hole formed in the thickness of the casing 44 of the high pressure compressor 10, so that it opens out into the compressor stream upstream from the first rotor wheel 20. The hole in the outer casing 44 has an upstream, first portion 72 and a downstream, second portion 74. The first portion 72 of the hole in the outer casing 44 is formed in the upstream annular flange of the outer casing 44 of the compressor 10 and is oriented in such a manner that its upstream end opens out into the hole 70 of the downstream plate 18 situated between the bolts 46, and its downstream end opens out into the upstream end of the second portion 74 of the hole between two vanes of the inlet guide vane 32 of the high pressure compressor 10 (FIG. 4). The second portion 74 of the hole is oblique and its downstream end opens out into the stream of the high pressure compressor 10. This second portion 74 is oriented substantially tangentially to the inside surface of the outer casing 44 and towards the leading edges of the blades of the first rotor wheel 20 of the compressor 10.

The diameter of the hole 70 in the downstream plate 18 is greater than the diameter of the first portion 72 of the hole in the outer casing 44, which in turn is greater than the diameter of the second portion 74 of the hole in the outer casing 44.

The operation of this circuit for injecting air into the high pressure compressor operates as follows. A fraction of the air flowing in the high pressure compressor stream 10 is bled off via the duct 54 and the tube 68 feeding the manifold 56. The air that flows annularly in the manifold 56 is reinjected into the holes 70, 72, and 74 of the downstream plate 18 and of the outer casing 44.

The diameters of the first and second portions 72, 74 of the hole in the outer casing 44 may be of the order of 5 millimeters (mm) and 3 mm, respectively.

In a variant, the manifold 56 may have a plurality of feed orifices 66 distributed over the circumference of the downstream plate 18, each feed orifice 66 being connected by a tube 68 to a duct 54 for bleeding air from the stream flowing through the high pressure compressor 10.

The annular manifold 56 may have a section of area that varies in the circumferential direction so as to deliver air at substantially uniform pressure to all of the holes 70 in the downstream plate 18, thereby avoiding circumferential non-uniformities of static pressure around the axis 11 of the compressor 10, which would be harmful to the operation thereof.

The manifold 56 may extend over 360° or less. In the embodiment shown in the drawings, the manifold 56 extends over approximately 320° and passes through eight of the ten arms 58 of the intermediate casing 12.

The radially outer wall 65 of the manifold 56 may be made as a casting together with the flow deflector walls 60 and the annular plate 18, or else it may be fitted between the deflector walls 60 and the annular plate 18.

The invention claimed is:

1. A turbomachine or a bypass turbojet comprising:
an intermediate casing arranged axially between a low pressure compressor and a high pressure compressor, the low pressure compressor and the high pressure compressor being housed within a primary annular air path that is surrounded by a secondary annular path, the intermediate casing including an inner wall forming a body of revolution defining an outside of the primary annular air path and an outer wall forming a body of revolution that defines the inside of the secondary annular path, the inner wall of the intermediate casing being fastened at its downstream end to an outer casing of the high pressure compressor, air bleed means for bleeding air downstream from the primary annular air path through the high pressure compressor, an outlet of the air bleed means being connected to air reinjection means for reinjecting air into an upstream portion of the high pressure compressor,
wherein the air bleed means is connected to the air reinjection means by an annular manifold surrounding the inner wall of the intermediate casing upstream from the high pressure compressor and situated radially between said inner wall of the intermediate casing and the outer wall of the intermediate casing.

2. A turbomachine according to claim 1, wherein the manifold extends between a downstream annular plate of the intermediate casing and curved flow deflection walls formed in the intermediate casing at outlets from discharge valves.

3. A turbomachine according to claim 2, wherein the manifold is defined at least in part by the curved flow deflection walls, by the downstream annular plate of the intermediate casing and by the inner wall of the intermediate casing.

4. A turbomachine according to claim 2, wherein the manifold comprises a radially outer wall connecting the flow deflection walls to the downstream annular plate of the intermediate casing.

5. A turbomachine according to claim 4, wherein the radially outer wall of the manifold is made as a casting together with the flow deflection walls and the downstream annular plate.

6. A turbomachine according to claim 4, wherein the radially outer wall of the manifold is disposed between the flow deflection walls and the downstream annular plate.

7. A turbomachine according to claim 1, wherein the manifold extends through at least one radial arm of the intermediate casing.

8. A turbomachine according to claim 1, wherein the manifold has an angular extent that is less than or equal to 360°.

9. A turbomachine according to claim 1, wherein the manifold includes at least one feed orifice made in a downstream annular plate of the intermediate casing and connected to the air bleed means.

10. A turbomachine according to claim 1, wherein the air reinjection means comprises a plurality of holes formed in a downstream annular plate of the intermediate casing and distributed at a periphery of the manifold.

11. A turbomachine according to claim 10, wherein each hole opens out downstream into another hole formed in a thickness of the outer casing of the compressor, the other hole opening out into the primary annular air path through the high pressure compressor upstream from a first rotor wheel.

12. A turbomachine according to claim 11, wherein the other hole comprises a first portion opening out into a second portion that is oblique and oriented towards leading edges of the blades of the first rotor wheel of the high pressure compressor.

13. A turbomachine or a bypass turbojet comprising:
an intermediate casing including an inner wall forming a body of revolution defining an outside of a primary air flow stream;
an outer casing of a high pressure compressor fastened to a downstream end of the intermediate casing; and
air bleed means for bleeding air downstream from the stream through the high pressure compressor, an outlet of the air bleed means being connected to air reinjection means for reinjecting air into an upstream portion of the high pressure compressor,
wherein the air bleed means is connected to the air reinjection means by an annular manifold surrounding the inner wall of the intermediate casing upstream from the high pressure compressor and situated radially between an inner wall and an outer wall of the intermediate casing forming a body of revolution that defines an inside of the secondary air flow stream of the turbomachine,
wherein the air reinjection means comprises a plurality of holes formed in the downstream annular plate of the intermediate casing and distributed at a periphery of the manifold, and
wherein each hole opens out downstream into another hole formed in a thickness of the outer casing of the compressor, the other hole opening out into the stream through the compressor upstream from a first rotor wheel.

* * * * *